United States Patent
Sainton

(10) Patent No.: US 10,606,372 B2
(45) Date of Patent: Mar. 31, 2020

(54) SYSTEM AND METHOD FOR INTERACTION WITH A COMPUTER IMPLEMENTED INTERACTIVE APPLICATION USING A DEPTH AWARE CAMERA

(71) Applicant: Alterface Projects, Wavre (BE)

(72) Inventor: Etienne Sainton, Wavre (BE)

(73) Assignee: Alterface Projects, Wavre (BE)

( * ) Notice: Subject to any disclaimer, the term of this patent is extended or adjusted under 35 U.S.C. 154(b) by 51 days.

(21) Appl. No.: 15/914,026

(22) Filed: Mar. 7, 2018

(65) Prior Publication Data

US 2018/0260039 A1   Sep. 13, 2018

(30) Foreign Application Priority Data

Mar. 10, 2017  (EP) .................................... 17160439

(51) Int. Cl.
*G09G 5/00* (2006.01)
*G06F 3/03* (2006.01)
(Continued)

(52) U.S. Cl.
CPC ............ *G06F 3/0304* (2013.01); *G06F 3/017* (2013.01); *G06K 9/00335* (2013.01);
(Continued)

(58) Field of Classification Search
CPC ......... G06F 3/017; G06F 3/0304; G06K 9/00; G06K 9/00201; G06K 9/00335;
(Continued)

(56) References Cited

U.S. PATENT DOCUMENTS

2009/0167679 A1   7/2009  Klier et al.
2011/0193939 A1*  8/2011  Vassigh ................... G06F 3/011
                                                                    348/46
(Continued)

OTHER PUBLICATIONS

De Souza et al: "5* Magic Wand: a RGBD camera-based 5 DoF pointing device for 3D interaction", SBC Journal of Interactive Systems, vol. 6, No. 2, 2015, pp. 22-29.
(Continued)

*Primary Examiner* — Insa Sadio
(74) *Attorney, Agent, or Firm* — Christopher Casieri

(57) ABSTRACT

System for interaction between a computer implemented interactive application and a user (1) located in an interactive zone (2) of said system, said system comprising:
- a passive object (3) comprising a grasping portion for receiving the hand of a user and a marked portion comprising a distinctive spot (4) having distinct visual property;
- a depth-aware camera (5);
- a controller (7) for receiving the images produced by said depth-aware camera (5) and being configured to compute two possibilities for the 3D coordinates of said distinctive spot (4) from the knowledge of (i) the 3D coordinates of the wrist joint (9) of said user, (ii) the 2D coordinates (M,N) of said distinctive spot (4) in a contrast image (6) received from said depth aware camera and of (iii) an estimated distance R between the wrist of the user's hand holding the passive object (3) and the distinctive spot (4) of said passive object (3).

12 Claims, 2 Drawing Sheets

(51) Int. Cl.
  *G06F 3/01* (2006.01)
  *G06T 7/70* (2017.01)
  *G06K 9/00* (2006.01)
  *G06T 7/73* (2017.01)
(52) U.S. Cl.
  CPC ............ *G06K 9/00355* (2013.01); *G06T 7/70* (2017.01); *G06T 7/74* (2017.01); *G06K 9/00201* (2013.01); *G06K 9/00362* (2013.01); *G06T 2207/10028* (2013.01); *G06T 2207/30196* (2013.01); *G06T 2207/30204* (2013.01)
(58) Field of Classification Search
  CPC ............ G06K 9/00355; G06K 9/00362; G06T 2207/10028; G06T 2207/30196; G06T 2207/30204; G06T 7/70; G06T 7/74
  See application file for complete search history.

(56) References Cited

U.S. PATENT DOCUMENTS

2012/0293518 A1* 11/2012 Geisner .................. G06F 3/011
                                                              345/474
2016/0155233 A1*  6/2016 Plagge .................. G08C 23/04
                                                              382/103

OTHER PUBLICATIONS

European Search Report for Application No. 17160439 dated Jul. 7, 2017.

* cited by examiner

SYSTEM AND METHOD FOR INTERACTION WITH A COMPUTER IMPLEMENTED INTERACTIVE APPLICATION USING A DEPTH AWARE CAMERA

FIELD OF THE INVENTION

The invention relates to a system and method for interaction between a user holding a passive object and a computer implemented interactive application using a depth aware camera.

DESCRIPTION OF PRIOR ART

A depth aware camera or range camera is a device able to produce an image comprising data relating to the distance of scene objects present in the field of imaging of said camera. The resulting image, the so-called depth or range image (or depth map), comprises an array of depth values, that correspond to the distance between the depth sensor of the camera and the surface of objects present in the field of imaging. Among other things, the coordinates in a Cartesian system of the surface of the objects present in the field of imaging can be computed from the depth values stored in the depth image.

Depth aware cameras have numerous current and potential future applications, especially in technical fields requiring human-computer interactions (HCI). In these applications, it is known from the prior art to generate interaction between a user performing gestures with a passive device and a computation system connected to a depth aware camera. In response to the gestures of the user, the computation system displays for example information on a screen or activates connected objects in an interactive environment.

Document U.S. Pat. No. 8,149,210 discloses a HCI system wherein a depth aware camera is used in order to generate a pointing line passing by one of the eyes and a pointing finger of a user or between two points on a pointing passive object. The system subsequently computes the coordinates of the intersection between said pointing line and a screen, this allowing the user to point at a selected graphical object on said screen. In the implementation disclosed in this document, the 3D coordinates of several points have to be retrieved from the depth image. This is computationally expensive and this limits the applicability of the implementation when a high processing speed and accuracy are required.

SBC Journal on Interactive Systems, volume 6, number, 2015, pages 22-29 discloses a method to track the position and the orientation of a passive magic wand with the help of time-of-flight depth aware camera. The time-of-flight depth aware camera also comprises a RGB sensor. The tracking of the magic wand is performed thanks to the presence of two colored spots on the wand which are localized by a computer on a color image taken by the RGB sensor. Once the colored spots have been localized on the color image thanks to a segmentation algorithm, depth data regarding the colored spots are extracted from the depth image. Such implementation imposes some constraints on the aesthetics of the passive magic wand, since it has to contain a plurality colored spots. Furthermore, producing and extracting the depth data for several points of the magic wand is computationally expensive and this limits the applicability of the implementation when a high processing speed and accuracy is required.

Document WO2014/130884 discloses a system and method for tracking a passive wand and actuating an effect based on a detected wand path. The system makes use of a source to emit electromagnetic radiation into a playing area and of a sensing device to receive the electromagnetic radiation after being reflected from a retro-reflective material of an article positioned in the playing area. The system also comprises a controller to perform gesture recognition but the disclosed system is only able to deal with motions in two dimensions because no depth imaging is implemented.

SUMMARY OF THE INVENTION

It is an object of the present invention to provide a system and method for interaction with a computer implemented interactive application having a high processing speed and high reliability.

It is another object to provide a system and method for interaction between a computer implemented interactive application and a user holding an object wherein a low level of constraint is imposed for the design of said object and a 3D tracking of said object in an interactive zone is possible.

According to a first aspect, the invention relates to a system for interaction between a computer implemented interactive application and a user located in an interactive zone of said system, said system comprising:
- a passive object comprising a grasping portion for receiving a hand of said user and a marked portion comprising a distinctive spot having distinct visual property;
- a depth-aware camera, said depth-aware camera being able to produce a depth-image of said interactive zone, said depth-aware camera being also able to produce a contrast image representing an intensity measure of at least a portion of the electromagnetic spectrum coming from a field of view overlapping at least partially said interactive zone;
- a controller for receiving the depth-image and the contrast image produced by said depth-aware camera, said controller being able to compute from said depth-image the 3D coordinates in said interactive zone of a set of skeleton joints belonging to said user, said set of skeleton joints comprising the wrist joints of said user, said controller being also able to extract the 2D coordinates (M,N) of said distinctive spot in said contrast image when said passive object is held by a user in said field of view, said controller being able to identify in which hand said user holds said passive object,
- said controller being configured to compute two possibilities for the 3D coordinates of said distinctive spot from the knowledge of (i) the 3D coordinates of the wrists joints of said user, (ii) the 2D coordinates (M,N) of said distinctive spot in said contrast image and of (iii) a distance R received between the wrist of the user's hand holding the passive object and the distinctive spot of said passive object,
- said controller being configured to select one of said two possibilities based on information received from said computer implemented interactive application, said controller being configured to provide to said computer implemented interactive application the selected possibility for the 3D coordinates of said distinctive spot.

In an advantageous embodiment, the depth aware camera is a range gated time-of-flight camera, said range gated time-of flight camera comprising an infrared illumination unit for illuminating the interactive zone and an infrared image sensor to measure the infrared light reflected in the interactive zone.

In the previous embodiment, said distinctive spot advantageously comprises a reflective material and said controller is configured to extract the 2D coordinates of said distinctive spot in a contrast image produced by said infrared image sensor.

In another advantageous embodiment, the distinctive spot is a spot with a specific color and the depth-aware camera comprises a RGB color sensor, said controller being configured to extract the 2D coordinates of said distinctive spot in a contrast image produced by RGB color sensor.

In an advantageous embodiment, the passive object has an elongated body, said elongated body comprising a proximal and a distal portion, said proximal portion comprising the grasping portion for receiving a hand of said user and said marked portion being located at the tip of said distal portion.

In the previous embodiment, the controller is advantageously configured to compute the coordinates in the interactive zone of a pointing line p passing by the wrist of the user and the tip of said distal portion.

In the previous embodiment, the controller is configured to select one of the two possibilities for the 3D coordinates of said distinctive spot after having computed two pointing lines from said two possibilities for the 3D coordinates of said distinctive spot and identified the intersections between said two pointing lines and elements in the interactive area based on information received from said computer implemented interactive application.

In an advantageous embodiment, the controller is configured to identify in which hand said user holds said passive object from input information received from a human operator or from said computer interactive application.

In another advantageous embodiment, the controller is configured to detect whether a user holds the passive object in his right or left hand by assessing the correlation during a period of time between the projection of the 3D position of his right and left wrists in said contrast image and the 2D coordinates (M,N) of said distinctive spot in the contrast image.

According to a second aspect, the invention relates to a method for interaction between a user located in an interactive zone and a computer implemented interactive application using a system as described above comprising:

Taking a depth image and a contrast image of said interactive zone with a depth-aware camera;

Computing from said depth image the 3D coordinates of a set of skeleton joints comprising the wrists of said user;

Extracting the 2D coordinates (M,N) of the distinctive spot of said passive object in said contrast image;

Identifying in which hand said user holds said passive object;

Computing two possibilities for the 3D coordinates of said distinctive spot from the knowledge of (i) the 3D coordinates of the wrist joint of said user, (ii) the 2D coordinates (M,N) of said distinctive spot in said contrast image and of (iii) a distance R between the wrist of the user's hand holding the passive object and the distinctive spot of said passive object;

Selecting one of said two possibilities based on information received from said computer implemented interactive application;

Providing to said computer implemented interactive application the selected possibility for the 3D coordinates of said distinctive spot;

According to an advantageous implementation, the method according to the invention comprises the additional steps of computing the coordinates in the interactive zone of a pointing line p passing by the wrist of the user and the distinctive spot of said passive object, and providing said pointing line p to said computer implemented interactive application.

According to a third aspect, the invention relates to a computer program comprising instructions to cause the system according to the invention to execute the steps of the previous methods.

According to a fourth aspect, the invention relates to a computer-readable medium having stored thereon the above computer program.

SHORT DESCRIPTION OF THE DRAWINGS

These and further aspects of the invention will be explained in greater detail by way of example and with reference to the accompanying drawings in which.

DETAILED DESCRIPTION OF PREFERRED EMBODIMENTS

Depth Aware Cameras

A depth aware camera is thus a camera showing the distance to points in a scene from a specific point associated with a sensor of said camera. There exist several technologies to implement depth aware cameras.

Range gated time-of-flight cameras implement a method wherein an irradiating source sends pulsed light, typically infrared light, towards objects in a scene. The pulsed light travels to the body and is reflected back to a video camera that is equipped with a shutter to control the timing of receipt of light onto its sensor. Because part of every returning pulse is blocked by the shutter according to its time of arrival, the amount of light received relates to the distance the pulse has travelled. Accordingly, the amount of energy which is collected by the sensor is inversely proportional to the distance of the point from the sensor.

Direct time-of-flight imagers measure the direct time-of-flight required for a single laser pulse to leave the camera and reflect back onto the focal plane array. Also known as "trigger mode", the 3D images captured using this methodology comprise complete spatial and temporal date, recording full 3D scenes with single laser pulse. This allows rapid acquisition and rapid real-time processing of scene information.

Structured light use projected light patterns (often grids or horizontal bars) on to a scene. The way that these deform when striking surfaces allows structured-light 3D scanner to compute the depth and surface information of the objects in the scene.

Systems and Methods According to the Invention

Figure 1:
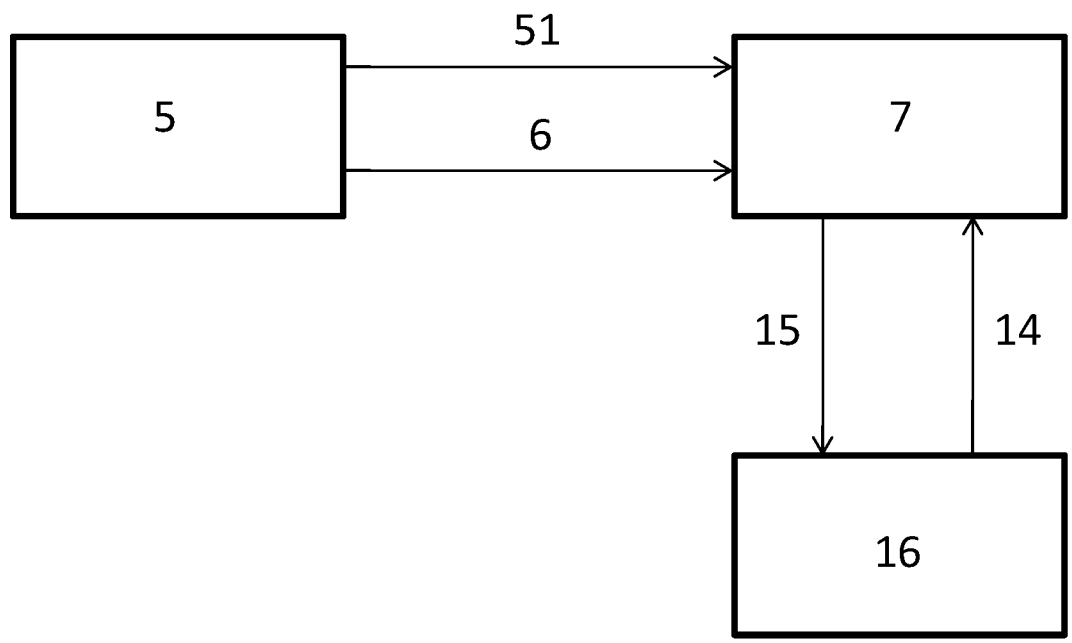
FIG. 1 shows block diagram of the main components involved in the system and method according to the invention.
Figure 2:
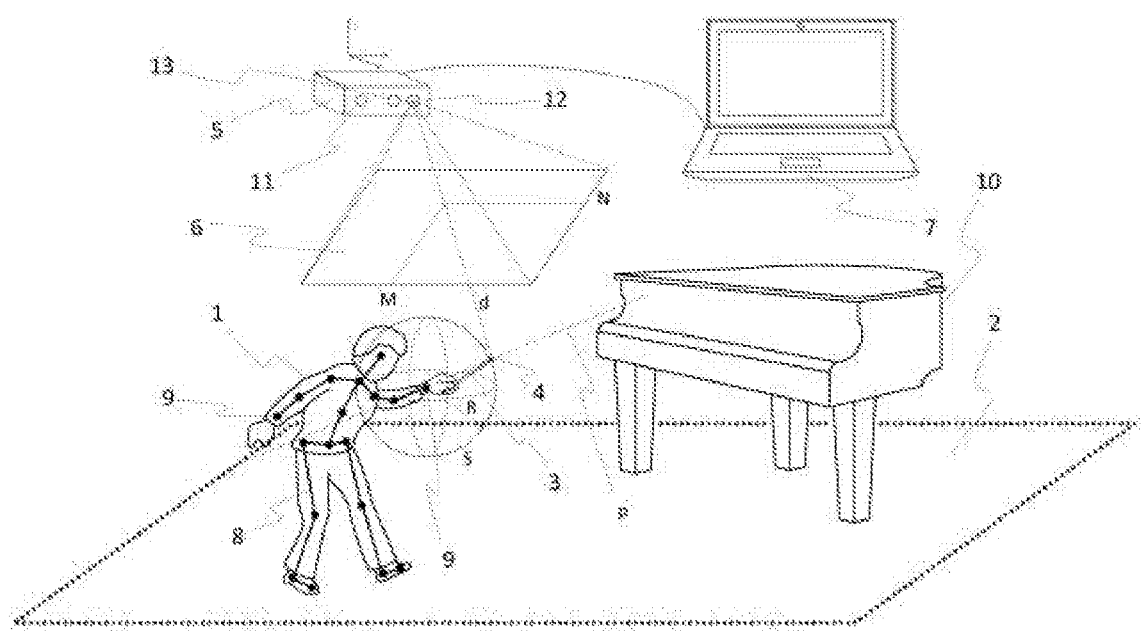
FIG. 2 shows an embodiment of the system according to the invention.

As described in FIG. 1 and FIG. 2, the invention relates to a system for interaction between a computer implemented interactive application 16 and a user 1 located in an interactive zone 2 of said system, said system comprising:

a passive object 3 comprising a grasping portion for receiving a hand of said user and a marked portion comprising a distinctive spot 4 having distinct visual property;

a depth-aware camera 5, said depth-aware camera 5 being able to produce a depth-image 51 of said interactive zone, said depth-aware camera 5 being also able to produce a contrast image 6 representing an intensity measure of at least a portion of the electromagnetic spectrum coming from a field of view overlapping at least partially said interactive zone 2;

a controller 7 for receiving the depth-image 51 and the contrast image 6 produced by said depth-aware camera 5, said controller 7 being able to compute from said depth-image 51 the 3D coordinates in said interactive zone 2 of a set of skeleton joints 8 belonging to said user 1, said set of skeleton joints 8 comprising the wrist joints 9 of said user, said controller 7 being also able to extract the 2D coordinates (M,N) of said distinctive spot 4 in said contrast image 6 when said passive object is held by a user 1 in said field of view, said controller 7 being able to identify in which hand said user 1 holds said passive object 3, said controller 7 being configured to compute two possibilities for the 3D coordinates of said distinctive spot 4 from the knowledge of (i) the 3D coordinates of the wrists joints 9 of said user, (ii) the 2D coordinates (M,N) of said distinctive spot 4 in said contrast image 6 and of (iii) a distance R between the wrist of the user's hand holding the passive object 3 and the distinctive spot 4 of said passive object 3, said controller 7 being configured to select one of said two possibilities based on information 14 received from said computer implemented interactive application 16, said controller 7 being configured to provide to said computer implemented interactive application 16 the selected possibility 15 for the 3D coordinates of said distinctive spot 4.

Systems and methods to track skeleton joints of human with the help of a depth-aware camera have been extensively described in the prior art. Powerful methods to track human bodies from depth images of a scene are for example introduced in document US20140022161. Depending on the method, either a specific 3D coordinate or a plurality of 3D coordinates can be provided for a given joint when methods taking into account that the joints having a spatial extent are used. When a plurality of 3D coordinates is provided for the location of the wrist 9, the controller 7 can be configured to either randomly select one of these points or advantageously to compute a spatial average of these points.

The knowledge of the 3D coordinates of the distinctive spot 4 of said passive object 3 will allow applying gesture recognition algorithms to detect a broad variety of interactions between the user 1 holding the passive object 3 and connected objects or other users present in the interactive zone 2 and monitored by the computer implemented interactive application 16. The computer implemented interactive application 16 is consequently an application running on a computer and possessing an internal representation of said interactive zone 2, said internal representation advantageously including the various objects, connected or not, and users 1 in the interactive zone 2. The computer implemented interactive application 16 receives as input data from controller 7 relating to the position of the distinctive spot 4. It can also receive data from other devices present in the interactive zone 2 as for example directly from the depth aware camera 5 or from other cameras or microphones collecting data from the interactive zone 2. In response an interaction from the user 1 holding the passive object 3, any computing device operatively connected to said controller 7 and managed by said computer implemented interactive application 16 can trigger actions from connected objects present in the interactive zone 2. The computer implemented interactive application 16 can be an entertainment application managing interactions between a plurality of users holding each a passive object 3 and connected objects placed inside the interactive zone 2. The computer implement interactive application 16 can use a screen to display video images to the user 1. In an advantageous embodiment, the computer implemented interactive application 16 provides on the screen a computer game environment wherein the user 2 interacts with the game by performing action with his passive object 3.

From a general point of view, the expression "controller" has to be understood as to designate one or a plurality of electronic computing devices for the processing of the different tasks exposed above. Such controller 7 can include electronic components physically integrated to the depth aware camera 5 and other components located remotely in a computer or plurality of computers managing the computer implemented interactive application. In an advantageous embodiment, the tasks of the controller 7 related to the computation of the 3D coordinates of the skeleton joints are performed by electronic components integrated to the depth aware camera 5 while the other tasks are performed by a remote computer operatively connected to said depth aware camera 5.

Throughout this text, the expression "passive object" has to be understood as to designate an object 3 held by said user 1 for interacting with the computer implemented interactive application 16 through the system according to the invention. This means that this object 3 has to comprise a marked portion with a distinctive spot 4 whose 2D coordinates (M,N) can be extracted from the contrast image 6, such to allow an interaction between said user 1 and said interactive implemented application 16 without requiring electronic bidirectional communication between the passive object 3 and the controller 7. The term "passive" does not further limit the scope intended for the design of the passive object 3. In this regard, the passive object 3 can for example comprise a distinctive spot 4 having a light emitting part.

In FIG. 1, the passive object 3 has the shape of a magic wand and is used by the user as a pointer in a computer implemented interactive application 16 controlling connected objects for entertainment purpose. In FIG. 1, a connected piano 10 able to play by himself when activated is indeed present. Such embodiment of the system according to the invention will typically be observed in interactive entertainment parks. The magic wand has thus an elongated body wherein the grasping portion is the proximal portion of the wand and the marked portion is located at the tip of the wand.

In order to locate the tip of the magic wand, the system according to the invention relies on the combination of information extracted from the depth images and contrast images provided by the depth aware camera. As there exist powerful methods to track the human body from depth images, the system according to the invention extrapolates from the knowledge of the 3D position of the wrist of a human user the 3D position of the tip of the magic wand held in said user's hand. Of course some additional information is needed to infer the 3D position of the wand. Some information is consequently extracted from a contrast image produced by said depth-aware camera wherein the 2D coordinates of said distinctive spot are extracted. The 2D coordinates (M,N) of said distinctive spot are advantageously extracted thanks to a segmentation algorithm. The result from said segmentation algorithm can be a plurality of points (pixels) in the contrast image 6 corresponding to the distinctive spot 4. In that case, the 2D coordinates (M,N) can be selected randomly among these points or correspond advantageously to a spatial average of these points. The extraction of the 2D coordinates from a contrast image 6 can be a very fast process. The controller also needs to receive as input an estimated distance between the wrist of the user's hand holding the passive object 3 and the distinctive spot 4 of said passive object 3. The precise value of the distance depends on the size and shape of the passive object 3 and also on the morphology of the user 1 and the way the user 1 is holding the passive object 3 at a specific time. Consequently, a precise universal value cannot be provided as input to the controller 7. In this regards, an estimated value is rather entered as input to the system according to the invention. In case the passive object is a magic wand with the distinctive spot located at its tip, it was observed that the length of the wand is an appropriate estimated value for the distance between the wrist of the user's hand holding the passive object 3 and the distinctive spot 4.

When computing the 3D coordinates of the distinctive spot, the controller 7 will need to know in which hand is held the passive object 3 in order to perform its calculations from the 3D coordinates of the proper wrist 9. In simple implementations, the controller can be configured to receive beforehand as input such information from a human operator or from said computer interactive application. The user 1 will then be informed that he has to hold the passive object 3 in his right or left hand and cannot interchange.

In other implementations, the controller 7 will be configured to determine by itself whether the user 1 holds the passive object 3 in his right or left hand by assessing the correlation during a period of time between the projection of the 3D position of his right and left wrists in the contrast image and the 2D coordinates (M,N) of said distinctive spot 4 in the contrast image 6. Typically, the controller 3 will assume that the proper wrist is the wrist having a projected distance from said distinctive spot 4 in said contrast image not exceeding a given threshold over a period of time, the given threshold being for example the estimated value for the distance between the wrist of the user and the distinctive spot received beforehand as input.

In some implementations, the system according to the invention will be configured to manage the interactions between several users 1 and the computer implemented interactive application 16. When several users 1 are present, it is necessary to determine which user 1 is holding a given passive object 3. In this regard, the correlation during a period of time between the projection of the 3D position of a body joint 8 of each user 1 in the contrast image and the 2D coordinates (M,N) of said distinctive spot 4 in the contrast image 6 can be assessed. Typically, the controller 3 will assume that the user 1 holding the passive object 3 is the user 1 whose joint 8 has a projected distance from said distinctive spot 4 in said contrast image not exceeding a given threshold over a period of time.

In FIG. 1, the depth aware camera 5 is a range gated time-of flight camera comprising an infrared illumination unit 11 for illuminating the interactive zone 2 and an infrared image sensor 12 to measure the infrared light reflected from the interactive zone 2. The depth images are computed by the depth aware camera 5 from the infrared contrast images produced by the infrared image sensor 12. In the advantageous embodiment of the invention shown in FIG. 1, the distinctive spot 4 comprises a reflective material, advantageously a retroreflective material, and the controller 7 is configured to extract the 2D coordinates (M,N) of the distinctive spot 4 in a contrast image produced by said infrared image sensor 12. In this implementation, the infrared image sensor 12 is consequently used to produce infrared contrast images used both for computing depth images of the interactive zone 2 and to extract the 2D coordinates (M,N) of the distinctive spot 4. The 2D coordinates (M,N) of the distinctive spot 4 can be easily retrieved from the contrast images, using for example a segmentation algorithm because the distinctive spot made of a reflective material appear as bright spots on the infrared contrast images. This implementation wherein 2D coordinates (M,N) are extracted from an infrared contrast image has proved to be very efficient because of the low latency time for the acquisition and treatment of the infrared contrast images. Furthermore the use of infrared contrast images and the presence of reflective material for the distinctive spot 4 is advantageous because the system can work even for interactive zones 2 having a dark environment. Furthermore the reflective material is usually a discreet material and consequently it does not impact significantly the appearance of the passive object 3. It has also to be noted that extracting accurate depth information of the reflective material directly from a depth image generated by a gate time-of-flight depth aware camera is usually not possible because of the saturation of the electronic sensor at these very bright spots. The system according to the invention does not meet this problem because the depth image is only used to compute the 3D position of the skeleton joints of the user 1.

In an alternative embodiment, the distinctive spot 4 is a spot with a specific color and the depth-aware camera comprises a RGB color sensor 13. The controller is then configured to extract the 2D coordinates of said distinctive spot in a contrast image produced by RGB color sensor 13.

Mathematically, the determination of the 3D coordinates of the distinctive spot from the knowledge of the 3D coordinates of the wrist of the user in said interactive zone, of the 2D coordinates (M,N) of the distinctive spot in a contrast image of a field of view overlapping said interactive zone and from an approximate distance R between said wrist and distinctive spot corresponds to the determination of the intersections between a sphere S of radius R centered at the wrist 9 of the user and a straight line D representing the possible 3D coordinates for the given 2D coordinates (M,N) in the contrast image. There are generally two intersections between a sphere and a straight line. This is the reason why the controller in the system according to the invention is configured to make a choice between the two possibilities of computed coordinates.

This choice determines which one of the two possibilities will be considered by the system as the true 3D coordinates of said distinctive spot 4. This feature can be implemented in various ways depending on the specificities of the interactive application implemented. For example, when the passive object 3 is meant to be used as a pointer such to define a pointing line passing by said distinctive spot and by another point for example belonging to the skeleton of said user 1, two different pointing lines p will be calculated based on the two possibilities for said 3D coordinates of said distinctive spot. From said pointing lines, two different impact points will be calculated in the interactive zone 2 from information 14 provided by the computer implemented interactive application 16 to the controller 7, said information relating to the internal representation of the interactive zone 2 in the computer implemented interactive application 16. At this stage, the controller 7 will select one of the possibilities by for example looking at the two different impact points in the interactive zone 2 and select the one which is supposed to trigger an interaction between the user 1 and the interactive application 16. For example, if the user 1 is supposed to be interacting with a screen, the controller 7 will select the 3D coordinates of said distinctive spot 4 corresponding to the a line pointing toward the screen. In other embodiments, the selection can be based on information related to the positions of the skeleton joints of the user 1 or also on information related to the past action of the user 1 during his interactive experience, provided such information is monitored by the computer implemented interactive application 16. In yet other embodiments, the selection can be based on the actions of other users in the interactive zone 2.

In the case of the system represented in FIG. 1, where the passive object is a magic wand 3 used as a pointer, the coordinates of the pointing line p passing by the wrist and tip of said magic wand are computed. The intersection between such pointing line and objects or other users present in the interactive zone 2 can subsequently be computed by the computer implemented interactive application 16. It has been observed that such implementation for computing a pointing line is very efficient because such pointing line meets the expectations of the users in terms of intuitiveness. Furthermore, this implementation is made possible by the 3D tracking of the wrist joint 9 of the user 1 for which powerful algorithms exist as explained above. It has also to be noted that this implementation only requires the presence of one distinctive spot on the pointer. Once such pointing line p is known, the coordinates of the intersection with elements like for example connected objects present in the interactive zone 2 can be computed by the computer implemented interactive application 16. When the computer implemented interactive application 16 provides a computer game environment displayed on a screen, an impact point of the pointing line p can be computed in the game environment coordinate system inside the screen, such that the user 2 interacts with the game by using his passive object 3 as pointer in the game environment.

Figure 3:
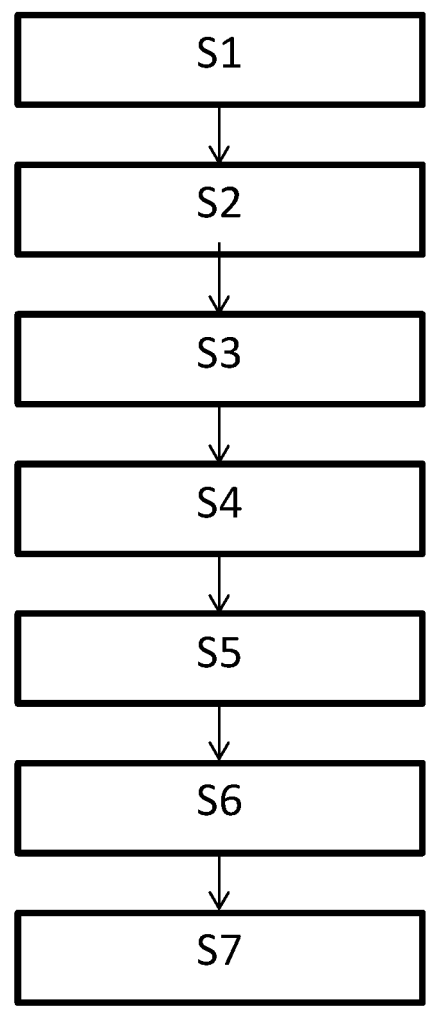
FIG. 3 shows a flowchart of an implementation of the method according to the invention.

As described in FIG. 3, the invention also relates to the following computer implemented method between a user 1 located in an interactive zone 2 and a computer implemented interactive application using a system as described above, comprising:

Taking S1 a depth image (51) and a contrast image (6) of said interactive zone (2) with a depth-aware camera (5);

Computing S2 from said depth image 51 the 3D coordinates of a set of skeleton joints 8 comprising the wrists 9 of a user 1;

Extracting S3 the 2D coordinates (M,N) of the distinctive spot 4 of said passive object 3 in said contrast image (6);

Identifying S4 in which hand said user 1 holds said passive object 3;

Computing S5 two possibilities for the 3D coordinates of said distinctive spot 4 from the knowledge of (i) the 3D coordinates of the wrist joint 9 of said user, (ii) the 2D coordinates M,N of said distinctive spot 4 in said contrast image (6) and of (iii) an distance R between the wrist of the user's hand holding the passive object 3 and the distinctive spot 4 of said passive object 3;

Selecting S6 one of said two possibilities based on information received from said computer implemented interactive application;

Providing S7 to said computer implemented interactive application 16 the selected possibility for the 3D coordinates of said distinctive spot 4.

In an advantageous implementation, the method according to the invention comprises the additional step of computing the coordinates in the interactive zone 2 of a pointing line p passing by the wrist 9 of the user 1 and the distinctive spot 4 of said passive object 3 and providing said pointing line p to said computer implemented interactive application 16.

The invention claimed is:

1. System for interaction between a computer implemented interactive application (16) and a user (1) located in an interactive zone (2) of said system, said system comprising
   a passive object (3) comprising a grasping portion for receiving a hand of said user (1) and a marked portion comprising a distinctive spot (4) having distinct visual property;
   a depth-aware camera (5), said depth-aware camera (5) being able to produce a depth-image (51) of said interactive zone (2), said depth-aware camera (5) being also able to produce a contrast image (6) representing an intensity measure of at least a portion of the electromagnetic spectrum coming from a field of view overlapping at least partially said interactive zone (2);
   a controller (7) for receiving the depth-image (51) and the contrast image (6) produced by said depth-aware camera (5),
   said controller (7) being able to compute from said depth-image (51) the 3D coordinates in said interactive zone (2) of a set of skeleton joints (8) belonging to said user (1), said set of skeleton joints (8) comprising the wrist joints (9) of said user, said controller (7) being also able to extract the 2D coordinates (M,N) of said distinctive spot (4) in said contrast image (6) when said passive object is held by a user (1) in said field of view, said controller (7) being able to identify in which hand said user (1) holds said passive object (3),
   said controller (7) being configured to compute two possibilities for the 3D coordinates of said distinctive spot (4) from the knowledge of (i) the 3D coordinates of the wrist joint (9) of said user, (ii) the 2D coordinates (M,N) of said distinctive spot (4) in said contrast image (6) and of (iii) a distance R between the wrist of the user's hand holding the passive object (3) and the distinctive spot (4) of said passive object (3), said controller (7) being configured to select one of said two possibilities based on information (14) received from said computer implemented interactive application (16), said controller (7) being configured to provide to said computer implemented interactive application (16) the selected possibility (15) for the 3D coordinates of said distinctive spot (4).

2. System according to claim 1 wherein the depth aware camera is a range gated time-of-flight camera, said range gated time-of flight camera (5) comprising an infrared illumination unit (11) for illuminating the interactive zone (2) and an infrared image sensor (12) to measure the infrared light reflected in the interactive zone (2).

3. System according to claim 2 wherein said distinctive spot (4) comprises a reflective material, said controller being configured to extract the 2D coordinates of said distinctive spot (4) in a contrast image produced by said infrared image sensor (12).

4. System according to claim 1 wherein said distinctive spot (4) is a spot with a specific color, said depth-aware camera comprising a RGB color sensor (13), said controller (7) being configured to extract the 2D coordinates of said distinctive spot (4) in a contrast image (6) produced by RGB color sensor (13).

5. System according to claim 1 wherein the passive object (3) has an elongated body, said elongated body comprising a proximal and a distal portion, said proximal portion comprising the grasping portion for receiving a hand of said user (1) and said marked portion being located at the tip of said distal portion.

6. System according to claim 5 wherein said controller (7) is configured to compute the coordinates in the interactive zone (2) of a pointing line (p) passing by the wrist (9) of the user (1) and the tip of said distal portion.

7. System according to claim 6 wherein said controller is configured to select one of the two possibilities for the 3D coordinates of said distinctive spot (4) after having computed two pointing lines (p) from said two possibilities for the 3D coordinates of said distinctive spot (4) and identified the intersections between said two pointing lines (p) and elements in the interactive area (2) based on information (14) received from said computer implemented interactive application (16).

8. System according to claim 1 wherein said controller (7) is configured to identify in which hand said user (1) holds said passive object (3) from input information received from a human operator or from said computer interactive application (16).

9. System according to claim 1 wherein said controller is configured to detect whether a user (1) holds the passive object (3) in his right or left hand by assessing the correlation during a period of time between the projection of the 3D position of his right and left wrists in said contrast image (6) and the 2D coordinates (IAN) of said distinctive spot (4) in said contrast image (6).

10. A method for interaction between a user (1) located in an interactive zone (2) and a computer implemented interactive application using a system according to claim 1 comprising:

Taking (S1) a depth image (51) and a contrast image (6) of said interactive zone (2) with a depth-aware camera (5);

Computing (S2) from said depth image (51) the 3D coordinates of a set of skeleton joints (8) comprising the wrists (9) of said user (1);

Extracting (S3) the 2D coordinates (M,N) of the distinctive spot (4) of said passive object (3) in said contrast image (6);

Identifying (S4) in which hand said user (1) holds said passive object (3);

Computing (S5) two possibilities for the 3D coordinates of said distinctive spot from the knowledge of (i) the 3D coordinates of the wrist joint (9) of said user, (ii) the 2D coordinates (IAN) of said distinctive spot (4) in said contrast image (6) and of (iii) a distance R between the wrist of the user's hand holding the passive object (3) and the distinctive spot (4) of said passive object (3);

Selecting (S6) one of said two possibilities based on information received from said computer implemented interactive application;

Providing (S7) to said computer implemented interactive application the selected possibility for the 3D coordinates of said distinctive spot (4).

11. A method according to claim 10 wherein it comprises the additional step of computing the coordinates in the interactive zone (2) of a pointing line (p) passing by the wrist (9) of the user (1) and the distinctive spot (4) of said passive object (3) and providing said pointing line (p) to said computer implemented interactive application (16).

12. A computer program stored on a computer-readable medium comprising instructions to cause the system according to claim 1 to execute the steps of method claim 11.

* * * * *